(12) United States Patent
McKinzie et al.

(10) Patent No.: US 11,654,900 B2
(45) Date of Patent: May 23, 2023

(54) VEHICLE STOP TRANSMISSION CONTROL SYSTEM AND METHOD

(71) Applicant: Deere & Company, Moline, IL (US)

(72) Inventors: Kyle K. McKinzie, Oswego, KS (US); Benjamin J. Hertel, S. Coffeyville, OK (US); Clayton G. Janasek, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 237 days.

(21) Appl. No.: 17/115,512

(22) Filed: Dec. 8, 2020

(65) Prior Publication Data
US 2022/0176946 A1    Jun. 9, 2022

(51) Int. Cl.
| | | |
|---|---|---|
| *B60W 30/09* | (2012.01) | |
| *B60T 7/12* | (2006.01) | |
| *B60W 10/18* | (2012.01) | |
| *B60W 10/02* | (2006.01) | |

(52) U.S. Cl.
CPC .............. *B60W 30/09* (2013.01); *B60T 7/12* (2013.01); *B60W 10/02* (2013.01); *B60W 10/18* (2013.01); *B60W 2300/152* (2013.01); *B60W 2520/10* (2013.01); *B60W 2554/804* (2020.02); *B60W 2710/022* (2013.01); *B60W 2710/027* (2013.01); *B60W 2710/18* (2013.01)

(58) Field of Classification Search
CPC .................................................. B60W 30/09
See application file for complete search history.

(56) References Cited

U.S. PATENT DOCUMENTS

| | | |
|---|---|---|
| 3,651,904 A | 3/1972 | Snoy et al. |
| 4,090,414 A | 5/1978 | White |
| 4,989,470 A | 2/1991 | Bulgrien |
| (Continued) | | |

FOREIGN PATENT DOCUMENTS

| | | |
|---|---|---|
| DE | 102015207555 A1 | 10/2015 |
| DE | 102015215461 A1 | 2/2016 |
| (Continued) | | |

OTHER PUBLICATIONS

German Search Report issued in counterpart application No. 102021201057.1 dated Jul. 28, 2021. (10 pages).

(Continued)

*Primary Examiner* — Michael A Berns
(74) *Attorney, Agent, or Firm* — Klintworth & Rozenblat IP LLP

(57) ABSTRACT

A control system includes a transmission and a controller configured to receive a vehicle stop command; determine a ground speed; compare the ground speed to first and second predetermined speed thresholds; generate, when the ground speed exceeds the second predetermined speed threshold, a downshift command; generate, when the ground speed is greater than the first predetermined speed threshold and less than or equal to the second predetermined speed threshold, a shuttle shift command; determine, when the ground speed is less than or equal to the first predetermined speed threshold, if the transmission is operating in the first or second (Continued)

mode; select, upon determining the operating mode, a four-square clutch; and at least partially engage the selected four-square clutch to slow or stop the work vehicle.

20 Claims, 6 Drawing Sheets

(56) References Cited

U.S. PATENT DOCUMENTS

| | | | |
|---|---|---|---|
| 5,353,662 A | 10/1994 | Vaughters | |
| 6,684,148 B2 | 1/2004 | Chess | |
| 8,544,964 B2 | 10/2013 | Rekow et al. | |
| 8,986,162 B2* | 3/2015 | Dix | B60W 10/103 477/68 |
| 10,975,959 B2* | 4/2021 | McKinzie | F16H 61/04 |
| 11,220,171 B2* | 1/2022 | Weeramantry | B60K 6/387 |
| 2004/0094381 A1 | 5/2004 | Versteyhe | |
| 2013/0054098 A1 | 2/2013 | Lorentz et al. | |
| 2014/0315685 A1 | 10/2014 | Hofler | |
| 2015/0101431 A1 | 4/2015 | Hou et al. | |
| 2015/0307101 A1* | 10/2015 | Ries | B60W 30/186 192/219 |
| 2018/0043764 A1 | 2/2018 | McKinzie et al. | |
| 2020/0309258 A1 | 10/2020 | McKinzie et al. | |
| 2021/0197772 A1 | 7/2021 | Tsumano | |
| 2022/0176946 A1* | 6/2022 | McKinzie | B60W 10/11 |

FOREIGN PATENT DOCUMENTS

| | | |
|---|---|---|
| DE | 102016200174 A1 | 7/2017 |
| DE | 102018212712 A1 | 1/2019 |
| DE | 102020202651 A1 | 11/2020 |
| EP | 0708276 A2 | 4/1996 |
| EP | 2855226 A2 | 4/2015 |
| GB | 2576746 A | 3/2020 |

OTHER PUBLICATIONS

German Search Report issued in application No. DE102021211456.3 dated Apr. 5, 2022 (08 pages).

USPTO non-final Office Action issued in Utility U.S. Appl. No. 16/810,628 dated Feb. 2, 2022, 15 pages.

German Search Report issued in counterpart application No. 102020202651.3 dated Sep. 1, 2020. (8 pages).

USPTO pending Utility U.S. Appl. No. 16/810,628, filed Mar. 5, 2020.

USPTO non-final office action issued in Utility U.S. Appl. No. 16/371,598, filed Jul. 21, 2020.

* cited by examiner

VEHICLE STOP TRANSMISSION CONTROL SYSTEM AND METHOD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates a control system and method for a work vehicle, and more specifically to a transmission control system and method for stopping the work vehicle.

BACKGROUND OF THE DISCLOSURE

Work vehicles, such as tractors, wheel loaders, and other large agricultural, construction, or forestry vehicles, operate in various environments to perform a number of functions. Such vehicles may be operated manually by an operator, autonomously by a controller, or semi-autonomously as a combination of manual and autonomous operations. At times, it may desirable to supplement or, situationally, to functionally replace the primary vehicle braking systems to slow or stop the work vehicle, particularly under conditions suitable for autonomous control.

SUMMARY OF THE DISCLOSURE

The disclosure provides a vehicle stop transmission control system and method.

In one aspect, the disclosure provides a control system for operating a powertrain of a work vehicle having a power source configured to generate power for an output shaft. The control system includes a transmission positioned operatively between the power source and the output shaft and configured to selectively transfer the power from the power source to drive the output shaft in a first direction according to at least one forward mode and in a second direction according to at least one reverse mode. The transmission includes at least one forward input clutch configured for engagement when transferring the power in the at least one forward mode, at least one reverse input clutch configured for engagement when transferring the power in the at least one reverse mode, a first output clutch configured for engagement when transferring the power in a first mode of the at least one forward mode or the at least one reverse mode, and a second output clutch configured for engagement when transferring the power in a second mode of the at least one forward mode or the at least one reverse mode. The control system further includes a controller, having a processor and memory architecture, and configured to: receive or generate a vehicle stop command; determine a ground speed of the work vehicle; compare the ground speed to a first predetermined speed threshold and a second predetermined speed threshold; generate, when the ground speed exceeds the second predetermined speed threshold, at least one downshift command for the transmission to execute a downshift within the transmission; generate, when the ground speed is greater than the first predetermined speed threshold and less than or equal to the second predetermined speed threshold, at least one shuttle shift command for the transmission to execute a shuttle shift within the transmission; determine, when the ground speed is less than or equal to the first predetermined speed threshold, if the transmission is operating in the first mode or the second mode as an operating mode; select, upon determining the operating mode, a four-square clutch from the first output clutch and the second output clutch, including selecting the second output clutch as the selected four-square clutch when the transmission is operating in the first mode and the first output clutch as the selected four-square clutch when the transmission is operating in the second mode; and at least partially engage the selected four-square clutch to slow or stop the work vehicle.

In a further aspect, the disclosure provides a method of operating a powertrain of a work vehicle having a power source configured to generate power for an output shaft, a transmission positioned operatively between the power source and the output shaft and configured to selectively transfer the power from the power source to drive the output shaft in a first direction according to at least one forward mode and in a second direction according to at least one reverse mode. The transmission includes at least one forward input clutch configured for engagement when transferring the power in the at least one forward mode, at least one reverse input clutch configured for engagement when transferring the power in the at least one reverse mode, a first output clutch configured for engagement when transferring the power in a first mode of the at least one forward mode or the at least one reverse mode, and a second output clutch configured for engagement when transferring the power in a second mode of the at least one forward mode or the at least one reverse mode. The method includes receiving or generating a vehicle stop command to slow and stop the work vehicle; determining, with a controller on the work vehicle, a ground speed of the work vehicle; comparing by the controller the ground speed to a first predetermined speed threshold and a second predetermined speed threshold; generating by the controller, when the ground speed exceeds the second predetermined speed threshold, at least one downshift command for the transmission to execute a downshift within the transmission; generating by the controller, when the ground speed is greater than the first predetermined speed threshold and less than or equal to the second predetermined speed threshold, at least one shuttle shift command for the transmission to execute a shuttle shift within the transmission; determining by the controller, when the ground speed is less than or equal to the first predetermined speed threshold, if the transmission is operating in the first mode or the second mode as an operating mode; selecting by the controller, upon determining the operating mode, a four-square clutch from the first output clutch and the second output clutch, including selecting the second output clutch as the selected four-square clutch when the transmission is operating in the first mode and the first output clutch as the selected four-square clutch when the transmission is operating in the second mode; and at least partially engaging the selected four-square clutch to slow or stop the work vehicle.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
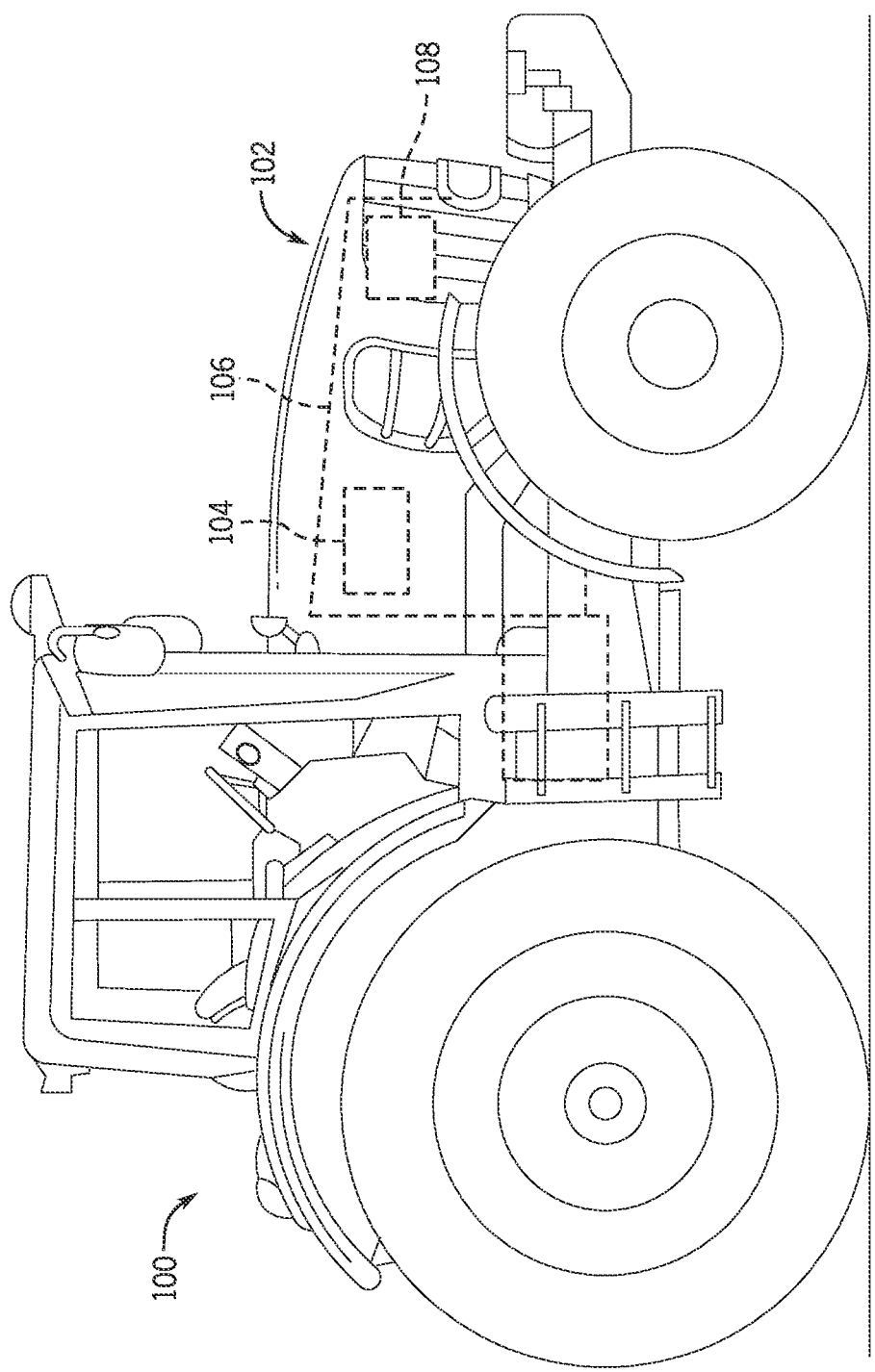
FIG. 1 is a side view of an example work vehicle that implements a vehicle stop transmission control system in accordance with this disclosure.

The following describes one or more example embodiments of the disclosed power train, vehicle, and transmission control system and method, as shown in the accompanying figures of the drawings described briefly above. Various modifications to the example embodiments may be contemplated by one of skill in the art.

Work vehicle operate across work locations to perform various functions under disparate conditions. During operation, at least some tasks and functions may be performed autonomously (or "automatically," used interchangeably herein), including functions associated with braking under certain conditions, such as obstacle avoidance and hill hold. For cost, efficiency, and/or performance, it is beneficial to implement vehicle braking with native hardware, even during autonomous situations. As an example of such native hardware in some work vehicles, aspects of the transmission may be designed to slow portions of the powertrain, e.g., to dissipate energy in the powertrain during a "shuttle shift" to change vehicle direction. As described in greater detail below, in a different context and implementation, the transmission may also be used to slow and subsequently stop the vehicle during a vehicle stop transmission operation. Such transmission operations may be useful as part of autonomous functions in that it obviates the need for additional hardware that would otherwise be required to automatically actuate other vehicle brakes (e.g., the axle, wheel, or parking brakes). Instead, the vehicle stop transmission operation may be implemented by a vehicle stop transmission control system managed by a controller and implemented by a suitable powershift transmission based on vehicle and environmental parameters.

Generally, the transmission may include any number of shafts, gears, clutches, and other power transfer elements to appropriately transfer and manipulate the torque and speed of power flow between an input coupled to a power source and an output coupled to the wheels. In particular, the clutches may be actuated by commands from the controller based on powershift operating schedules to appropriately condition the power as desired or needed for ordinary operation, as well as the braking functions during the vehicle stop transmission operation discussed in greater detail below.

In one example, the transmission may include one or more input clutches and at least two output clutches in which at least one of the input clutches and at least one of the output clutches are engaged during a typical propulsion operation; and upon conducting a vehicle stop transmission operation, the engaged input clutch may be modulated and/or subsequently disengaged while at least partially engaging one or more of the previously disengaged output clutches to dissipate the energy from the output shaft and wheels to slow, stop, and hold the vehicle. In effect, the vehicle stop transmission control system allows for a "four-squaring" of one or more output clutches of the powershift transmission to dissipate the excess energy within the powertrain to slow, stop, and hold the vehicle.

In some examples, the vehicle stop transmission control system may execute the four-squaring of one or more the output clutches as a function of the ground speed of the vehicle. In particular, based on the ground speed, the vehicle stop transmission control system may initiate a downshift and/or a shuttle shift within the transmission in order slow the ground speed to values more suitable for four-squaring. In one example, when the ground speed is greater than a shuttle shift threshold, the vehicle stop transmission control system may execute a downshift prior to the four-squaring operation; when the ground speed is greater than the four-square speed threshold and less than or equal to the shuttle shift speed threshold, the vehicle stop transmission control system may execute a shuttle shift prior to the four-squaring operation; and when the ground speed is less than or equal to the four-square speed threshold, the vehicle stop transmission control system immediately implements the four-squaring operation. Additionally and as described below, vehicle stop transmission control system may modulate the input and output clutches (as well as the four-squaring clutches) according to a predetermined clutch command schedule in order to provide smooth and effective deceleration and stopping of the work vehicle.

Referring to FIG. 1, a work vehicle 100 may include a vehicle stop transmission control system 102 provided and implemented with a controller 104, one or more components of a powertrain 106, one or more sensors 108, and/or selected additional components of the vehicle 100. As described in greater detail below, the vehicle stop transmission control system 102 is used to dissipate vehicle and/or powertrain energy to slow, stop, and/or hold the vehicle 100 (generally, "a vehicle stop transmission operation"). The execution of a vehicle stop transmission operation by the vehicle stop transmission control system 102 may be particularly useful within the context of an automated stop, such as for an obstacle avoidance and/or hill holds, as discussed in greater detail below. In one example, the vehicle stop transmission control system 102 may be used independently of (or in conjunction with) other brakes (e.g., axle, service, or parking brakes) of the vehicle 100.

In FIG. 1, the vehicle 100 is depicted as a tractor. It will be understood, however, that other configurations may be possible, including configurations with vehicle 100 as a different kind of tractor, a wheel loader, a harvester, a log skidder, a grader, or one of various other work vehicle types. It will further be understood that the disclosed powertrain 106 may also be used in non-work vehicles and non-vehicle applications (e.g., fixed-location power installations). In addition to the elements within the powertrain 106, the vehicle 100 may include one or more ancillary components or systems, such as steering, braking, and actuation systems to appropriately maneuver or manipulate aspects of the vehicle 100. Generally, the powertrain 106 includes one or more engines, motors, batteries, and power transfer elements to power the vehicle 100 in forward and reverse directions, as well as to provide mechanical or electrical power to various additional systems of the vehicle 100.

Generally, the controller 104 controls operation of the vehicle stop transmission control system 102, powertrain 106, and other aspects of the vehicle 100, including any of the functions described herein. The controller 104 may be configured as computing devices with associated processor devices and memory architectures, as hydraulic, electrical or electro-hydraulic controllers, or otherwise. As such, the controller 104 may be configured to execute various computational and control functionality with respect to the vehicle 100. The controller 104 may be in communication with various other systems or devices of the vehicle 100. For example, the controller 104 may be in electronic or hydraulic communication with various sensors (e.g., sensors 108), actuators, and other devices within (or outside of) the vehicle 100. Some of these sensors 108 are discussed in greater detail below. The controller 104 may communicate with other systems or devices (including other controllers) in various known ways, including via a CAN bus (not shown) of the vehicle 100 via wireless, wired, or hydraulic communication means, or otherwise. In some embodiments, the controller 104 may be configured to receive input commands and to interface with an operator via a human-machine interface or operator interface. The vehicle 100 may further include a lever or other operator input device that facilitates interaction with the power transfer elements of the powertrain 106 discussed herein, although in some examples, the controller 104 may implement one or more functions autonomously or automatically (e.g., without operator input).

The controller 104 may be considered the vehicle controller that controls overall operation of the vehicle 100, including control of the powertrain 106, autonomous and/or semi-autonomous control of the vehicle 100, and/or control of elements of the powertrain 106, such as a transmission. In some examples, the controller 104 may refer collectively to a group of control elements that may be dedicated to individual elements or systems of the vehicle 100.

The sensors 108 generally represent a collection of vehicle sensors to implement the functions described herein. For example, the sensors 108 may include one or more speed sensors to collect information associated with determining the speed of the vehicle (e.g., ground speed) and/or various aspects of powertrain 106. The sensors 108 may also include one or more location sensors (e.g., GPS or other kinematic sensors) and/or incline sensors. The sensors 108 further include one or more obstacle detection sensors, such as light detection and ranging (LIDAR) sensors, infrared and/or visible light cameras, radio detection and ranging (RADAR) sensors, laser sensors, ambient light sensors, and/or boundary sensors.

The controller 104 may use the information collected by the sensors 108 to identify conditions within an operating environment of the vehicle 100 or otherwise associated with the vehicle 100 (e.g., powertrain conditions, projected path information, obstacle maps, object identification, and the like). In response, the controller 104 may implement one or more aspects of autonomous or semi-autonomous vehicle control. For example, the controller 104 may generate commands for one or more aspects of the powertrain 106, including the braking system, the throttle system, and the steering system. In particular examples discussed below, the controller 104 may generate automated transmission commands to stop the vehicle 100 for one or more reasons, particularly in response to obstacles and/or to implement a hill hold.

Regarding obstacle avoidance, the sensors 108 collect information associated with the vehicle environment and the vehicle 100 and provide the information to the controller 104. The controller 104 may evaluate the environmental and/or vehicle information to identify obstacles in the projected path of the vehicle 100. When the obstacle is within the projected path of the vehicle 100, the controller 104 may generate a vehicle stop command for the transmission as a vehicle stop transmission operation of the vehicle stop transmission control system 102, as discussed in greater detail below.

Regarding hill hold, as above, the sensors 108 may collect information associated with the vehicle environment and the vehicle 100 and provide the information to the controller 104. Such information may include position or kinematic information on which vehicle incline information may be determined. Such information may further include powertrain information, such as torque and other parameters within the powertrain 106. The controller 104 may evaluate the environmental and/or vehicle information to identify conditions suitable for a hill hold. Such conditions may include the vehicle 100 being positioned on a hill or other type of incline in which gravity would otherwise result in the vehicle 100 rolling down the incline. When the hill hold conditions are identified, the controller 104 may generate a vehicle stop command for the transmission 124 as a vehicle stop transmission operation of the vehicle stop transmission control system 102, as discussed in greater detail below.

Additional details regarding the vehicle stop transmission operation of the vehicle stop transmission control system 102 are provided below. The operation may be automatically implemented based on one of the conditions discussed above, as well as other conditions, or manually implemented based on commands initiated by a vehicle operator.

Figure 2:
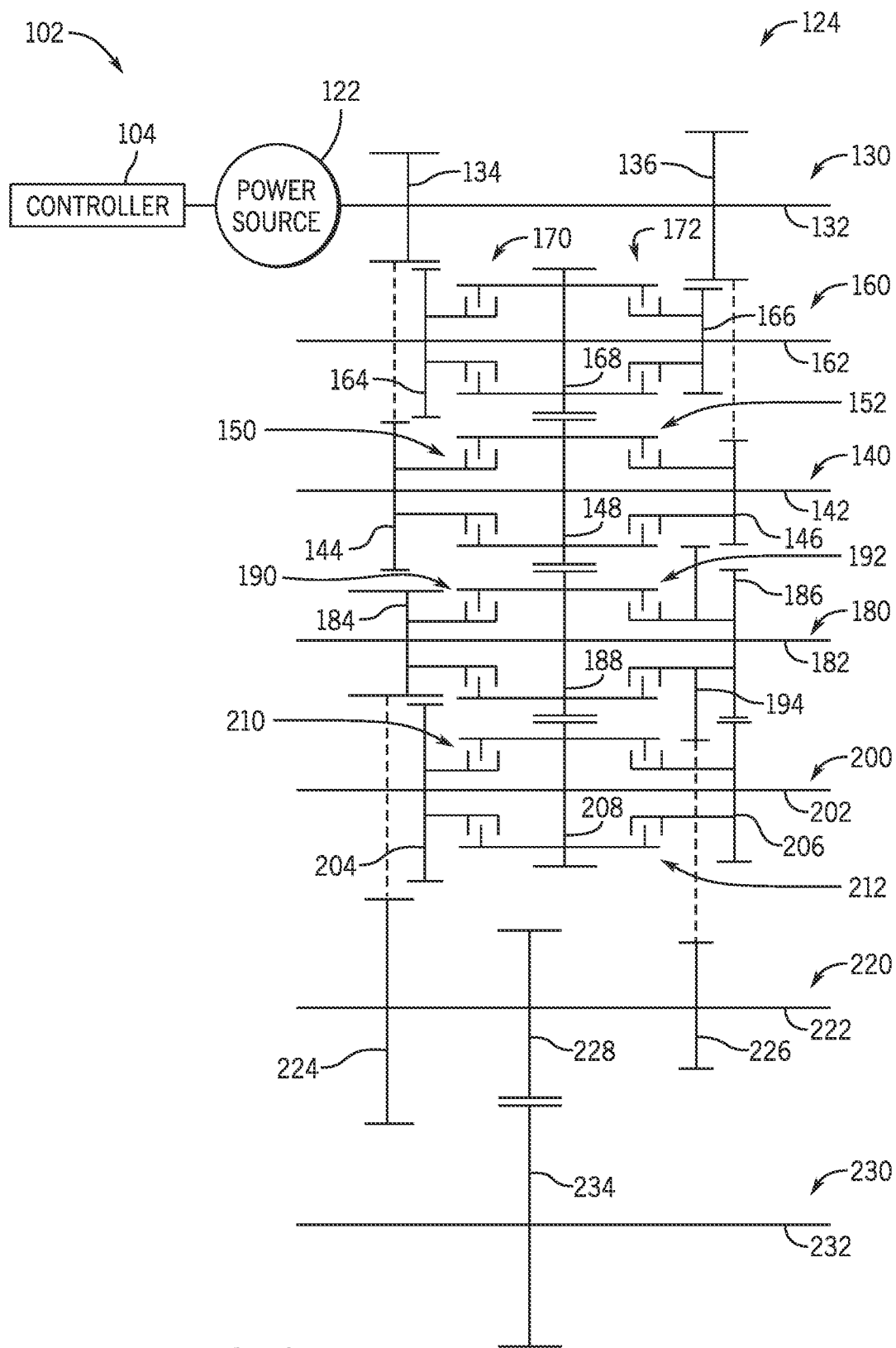
FIG. 2 is a schematic view of a powertrain of the vehicle stop transmission control system of the vehicle of FIG. 1 according to an example.

Reference is additionally made to FIG. 2, which a schematic view of the vehicle stop transmission control system 102 implemented within the vehicle 100 of FIG. 1. In the discussion below, various example configurations of shafts, gears, and other power transmission elements are described. It will be understood that various alternative configurations may be possible, within the spirit of this disclosure.

The view of FIG. 2 depicts the controller 104 coupled to portions of the powertrain 106, including a power source 122 and a transmission 124. The power source 122 may be any suitable power source, including an internal combustion engine, a continuously variable power source (CVP) (e.g., an electrical or hydraulic motor), or a combination of an engine and CVP. The transmission 124 may be any arrangement that transfers power from the power source 122 to an output. Generally, the transmission 124 may be a powershift transmission in which "gear" and/or speed or power ratio changes may be implemented automatically under command of the controller 104 based on operating conditions and shift schedules, including when under a load from the power source 122.

In one example, the transmission 124 may be considered to have a number of stages 130, 140, 160, 180, 200, 220, 230. In the transmission 124 of FIG. 2, seven (7) stages 130, 140, 160, 180, 200, 220, 230 are provided as an example. Each of the stages 130, 140, 160, 180, 200, 220, 230 is associated with one or more shafts 132, 142, 162, 182, 202, 222, 232, about which various power transfer elements are mounted. In this particular example, the first stage shaft 132 may be considered an input shaft for receiving power from the power source 122, and the seventh stage shaft 232 may be considered an output shaft that drives one or more components of the vehicle 100 (e.g., one or more ground-engaging wheels, implements, and/or power transfer devices).

As described below, the transmission 124 may include a number of clutches 150, 152, 170, 172, 190, 192, 210, 212 that may be manipulated based on commands from the controller 104 to completely transfer torque between two elements in engaged positions or to disconnect the transfer of torque between two elements in disengaged positions, thereby providing a number of power flow paths through the transmission 124 at various speeds and directions. Moreover, the clutches 150, 152, 170, 172, 190, 192, 210, 212 may be partially engaged or modulated such that the respective clutch elements slip relative to one another, thereby partially transferring or inhibiting torque transfer depending on the operating mode. The arrangement of the clutches 150, 152, 170, 172, 190, 192, 210, 212 within the stages 130, 140, 160, 180, 200, 220, 230 is described below.

As an example, one or more of the clutches (particularly clutches 190, 210) may be used to inhibit torque transfer in other portions of the transmission 124 to create internal energy losses by dissipating the energy (e.g., with heat and friction) to slow and/or stop the vehicle 100 as a vehicle stop transmission operation executed by the vehicle stop transmission control system 102, which will be described in greater detail below after an explanation of the transmission 124 of FIG. 2.

The first stage 130 includes a first gear 134 and a second gear 136 mounted for rotation with the first stage shaft 132. The second stage 140 includes a third gear 144, a fourth gear 146, and a fifth gear 148 mounted for rotation with the second stage shaft 142. The second stage 140 further includes a first input clutch 150 with a first element mounted to the third gear 144 and a second element mounted to the fifth gear 148, as well as a second input clutch 152 with a first element mounted to the fourth gear 146 and a second element mounted to the fifth gear 148. As noted, each of the first and second input clutches 150, 152 may be positioned into an engaged position, a disengaged position, or partially engaged positions to control a power flow between the respective portions and associated gears.

The third stage 160 includes a sixth gear 164, a seventh gear 166, and an eighth gear 168 mounted for rotation with the third stage shaft 162. The third stage 160 further includes a third input clutch 170 with a first element mounted to the sixth gear 164 and a second element mounted to the eighth gear 168, as well as a fourth input clutch 172 with a first element mounted to the seventh gear 166 and a second element mounted to the eighth gear 168. Each of the third and fourth input clutches 170, 172 may be positioned into an engaged position, a disengaged position, or partially engaged positions to control a power flow between the respective portions and associated gears.

The fourth stage 180 includes a ninth gear 184, a tenth gear 186, and an eleventh gear 188 mounted for rotation with the fourth stage shaft 182. The fourth stage 180 further includes a first output clutch 190 with a first element mounted to the ninth gear 184 and a second element mounted to the eleventh gear 188, as well as a second output clutch 192 with a first element mounted to the tenth gear 186 and a second element mounted to the eleventh gear 188. The fourth stage 180 further includes a twelfth gear 194 mounted to the first element of the second output clutch 192 (and thus, the tenth gear 186). Each of the first and second output clutches 190, 192 may be positioned into an engaged position or a disengaged position to control a power flow between the respective portions and associated gears. Additionally, the first and second output clutches 190, 192 may be partially engaged or modulated to partially transfer (or inhibit) torque.

The fifth stage 200 includes a thirteenth gear 204, a fourteenth gear 206, and a fifteenth mounted for rotation with the fifth stage shaft 202. The fifth stage 200 further includes a third output clutch 210 with a first element mounted to the thirteenth gear 204 and a second element mounted to the fifteenth gear 208, as well as a fourth output clutch 212 with a first element mounted to the fourteenth gear 206 and a second element mounted to the fifteenth gear 208. Each of the third and fourth output clutches 210, 212 may be positioned into an engaged position or a disengaged position to control a power flow between the respective portions and associated gears. Additionally, the third and fourth output clutches 210, 212 may be partially engaged or modulated to partially transfer (or inhibit) torque.

The sixth stage 220 includes a sixteenth gear 224, a seventeenth gear 226, and an eighteenth gear 228 mounted for rotation with the sixth stage shaft 222. The seventh stage 230 includes a nineteenth gear 234 mounted for rotation with the seventh stage shaft 232.

The stages 130, 140, 160, 180, 200, 220, 230 are arranged such that control of the clutches 150, 152, 170, 172, 190, 192, 210, 212 enables a selected power flow path between the first stage shaft 132 and the seventh stage shaft 232. In the depicted example, the first gear 134 of the first stage 130 is enmeshed or otherwise engaged with the third gear 144 of the second stage 140 and sixth gear 164 of the third stage 160. The second gear 136 of the first stage 130 is enmeshed or otherwise engaged with the fourth gear 146 of the second stage 140 and the seventh gear 166 of the third stage 160. Further, the fifth gear 148 of the second stage 140 is enmeshed or otherwise engaged with the eighth gear 168 of the third stage 160 and the eleventh gear 188 of the fourth stage 180. The ninth gear 184 of the fourth stage 180 is enmeshed or otherwise engaged with the thirteenth gear 204 of the fifth stage 200 and the sixteenth gear 224 of the sixth stage 220. The tenth gear 186 of the fourth stage 180 is enmeshed or otherwise engaged with the fourteenth gear 206 of the fifth stage 200. The twelfth gear 194 of the fourth stage 180 is enmeshed or otherwise engaged with the seventeenth gear 226 of the sixth stage 220. The eleventh gear 188 of the fourth stage 180 is enmeshed or otherwise engaged with the fifth gear 148 of the second stage 140 and the fifteenth gear 208 of the fifth stage 200. The eighteenth gear 228 of the sixth stage 220 is enmeshed or otherwise engaged with the nineteenth gear 234 of the seventh stage 230.

During operation, at least one of the input clutches 150, 152, 170, 172 may be selected with at least one of the output clutches 190, 192, 210, 212 to implement a number of different speed ratios and directions. In one example, the input clutches 150, 152, 170, 172 and the output clutches 190, 192, 210, 212 are manipulated to enable eight different speed ratios (or "modes" or "gears") in each of a forward direction and a reverse direction (e.g., modes F1-F8 and modes R1-R8). Generally, the first and second input clutches 150, 152 are used to implement the forward modes (F1-F8), and the third and fourth input clutches 170, 172 are used to implement the reverse modes (R1-R8).

Although the arrangements may vary, in the depicted transmission 124, the first forward mode (F1) is a lower speed and higher torque than the second forward mode (F2), which in turn is a lower speed and higher torque than the third forward mode (F3), and so on. Similarly, the first reverse mode (R1) is a lower speed and higher torque than the second reverse mode (R2), which in turn is a lower speed and higher torque than the third reverse mode (R3), and so on. The particular clutches 150, 152, 170, 172, 190, 192, 210, 212 that are engaged for each mode (F1-F8, R1-R8) are listed in Table 1.

and sixth reverse modes (R5, R6) use the third and fourth input clutches 170, 172, respectively, and the second output clutch 192; and the seventh and eighth reverse modes (R7,

TABLE (1)

| Mode | Input Clutch | Output Clutch | Four-Square Clutch |
|---|---|---|---|
| F1 | first input clutch 150 | first output clutch 190 | third output clutch 210 |
| F2 | second input clutch 152 | first output clutch 190 | third output clutch 210 |
| F3 | first input clutch 150 | third output clutch 210 | first output clutch 190 |
| F4 | second input clutch 152 | third output clutch 210 | first output clutch 190 |
| F5 | first input clutch 150 | second output clutch 192 | |
| F6 | second input clutch 152 | second output clutch 192 | |
| F7 | first input clutch 150 | fourth output clutch 212 | |
| F8 | second input clutch 152 | fourth output clutch 212 | |
| R1 | third input clutch 170 | first output clutch 190 | third output clutch 210 |
| R2 | fourth input clutch 172 | first output clutch 190 | third output clutch 210 |
| R3 | third input clutch 170 | third output clutch 210 | first output clutch 190 |
| R4 | fourth input clutch 172 | third output clutch 210 | first output clutch 190 |
| R5 | third input clutch 170 | second output clutch 192 | |
| R6 | fourth input clutch 172 | second output clutch 192 | |
| R7 | third input clutch 170 | fourth output clutch 212 | |
| R8 | fourth input clutch 172 | fourth output clutch 212 | |

As an example and referencing Table (1), in the first forward mode (F1), the first input clutch 150 and first output clutch 190 are engaged. As such, torque from the power source 122 is transferred to the first stage shaft 132, through the first gear 134 and the third gear 144, and across the first input clutch 150. The torque is then transferred through fifth gear 148 to eleventh gear 188, and across the first output clutch 190. From the first output clutch 190, the torque is transferred through the ninth gear 184 of the fourth stage 180 to the sixteenth gear 224 of the sixth stage 220, through the sixth stage shaft 222 to the eighteenth gear 228, and via the nineteenth gear 234, to the output shaft 232. The second forward mode (F2) is similar to the first forward mode (F1), except that the torque is transferred through the second input clutch 152 instead of the first input clutch 150. The third and fourth forward modes (F3, F4) use the first and second input clutches 150, 152, respectively, and the third output clutch 210. The fifth and sixth forward modes (F5, F6) use the first and second input clutches 150, 152, respectively, and the second output clutch 192; and the seventh and eighth forward modes (F7, F8) use the first and second input clutches 150, 152, respectively, and the fourth output clutch 212.

As an example and referencing Table (1), in the first reverse mode (R1), the third input clutch 170 and first output clutch 190 are engaged. As such, torque from the power source 122 is transferred to the first stage shaft 132, through the sixth gear 164, and across the third input clutch 170. The torque is then transferred through the eighth gear 168, through the fifth gear 148, through the eleventh gear 188, and across the first output clutch 190. From the first output clutch 190, the torque is transferred through the ninth gear 184 of the fourth stage 180 to the sixteenth gear 224 of the sixth stage 220, through the sixth stage shaft 222 to the eighteenth gear 228, and via the nineteenth gear 234, to the output shaft 232. In the reverse modes (R1-R8), the output shaft 232 is driven in opposite directions to those in the forward modes (F1-F8). The second reverse mode (R2) is similar to the first reverse mode (R1), except that the torque is transferred through the fourth input clutch 172 instead of the third input clutch 170. The third and fourth reverse modes (R3, R4) use the third and fourth input clutches 170, 172, respectively, and the third output clutch 210. The fifth R8) use the third and fourth input clutches 170, 172, respectively, and the fourth output clutch 212.

As such, during operation, the controller 104 commands the clutches 150, 152, 170, 172, 190, 192, 210, 212 to cycle through the forward and reverse modes, e.g., from F1 to F2 to F3 (or from R1 to R2 to R3), and so on, including back down from F8 to F7 to F6 (or from R8 to R7 to R6) and so on. Moving from a higher mode to a lower mode (e.g., from F8 to F7 and so on, or from R8 to R7 and so on) may be considered a "downshift." Additionally, at times, the controller 104 executes a "shuttle shift" in which the clutches 150, 152, 170, 172, 190, 192, 210, 212 are manipulated to change the output direction, e.g., from one of the forward modes to one of the reverse modes, or from one of the reverse modes to one of the forward modes.

As introduced above, the vehicle stop transmission control system 102 may also implement transmission braking in one or more of the modes (F1-F8, R1-R8) to stop and hold the vehicle 100 in a stationary position. For example, in a particular mode, one the output clutches that is not being used as part of the torque transfer path may be modulated and/or engaged to inhibit the power flow, thereby slowing down and stopping the vehicle. This transmission braking operation may be considered "four-squaring" and the clutch that is that is at least partially engaged may be considered the "four-square clutch."

In one example, the transmission braking may be implemented in the first four forward modes (F1-F4) and the first four reverse modes (R1-R4). The four-square clutches that may be used to implement the braking in the transmission 124 are also summarized in Table (1). For example and as noted above, in the first forward mode (F1), the first input clutch 150 and first output clutch 190 are engaged to transfer power from the power source 122, to the first stage shaft 132, through the first gear 134 and the third gear 144, across the first input clutch 150, through the fifth gear 148 and the eleventh gear 188, across the first output clutch 190, through the ninth gear 184 of the fourth stage 180 to the sixteenth gear 224 of the sixth stage 220, through the sixth stage shaft 222 to the eighteenth gear 228, and via the nineteenth gear 234, to the output shaft 232. During this power flow, the third output clutch 210 of the fifth stage 200 may be modulated and/or engaged to inhibit the rotation of the elements of fourth stage 180, thereby inhibiting the power flow to the output shaft 232. In the second forward mode (F2), the third output clutch 210 is also the four-square clutch, while the first output clutch 190 is the four-square clutch for the third and fourth forward modes (F3, F4).

A similar operation may occur in the reverse modes (R1-R8). For example and as noted above, in the first reverse mode (R1), the third input clutch 170 and first output clutch 190 are engaged to transfer power from the power source 122, to the first stage shaft 132, through the sixth gear 164, across the third input clutch 170, through the eighth gear 168, through the fifth gear 148, through eleventh gear 188, across the first output clutch 190, through the ninth gear 184 of the fourth stage 180 to the sixteenth gear 224 of the sixth stage 220, through the sixth stage shaft 222 to the eighteenth gear 228, and via the nineteenth gear 234, to the output shaft 232. During this power flow, the third output clutch 210 of the fifth stage 200 may be modulated and/or engaged to inhibit the rotation of the elements of fourth stage 180, thereby inhibiting the power flow to the output shaft 232. In the second reverse mode (R2), the third output clutch 210 is also the four-square clutch, while the first output clutch 190 is the four-square clutch for the third and fourth reverse modes (R3, R4).

Figure 3:
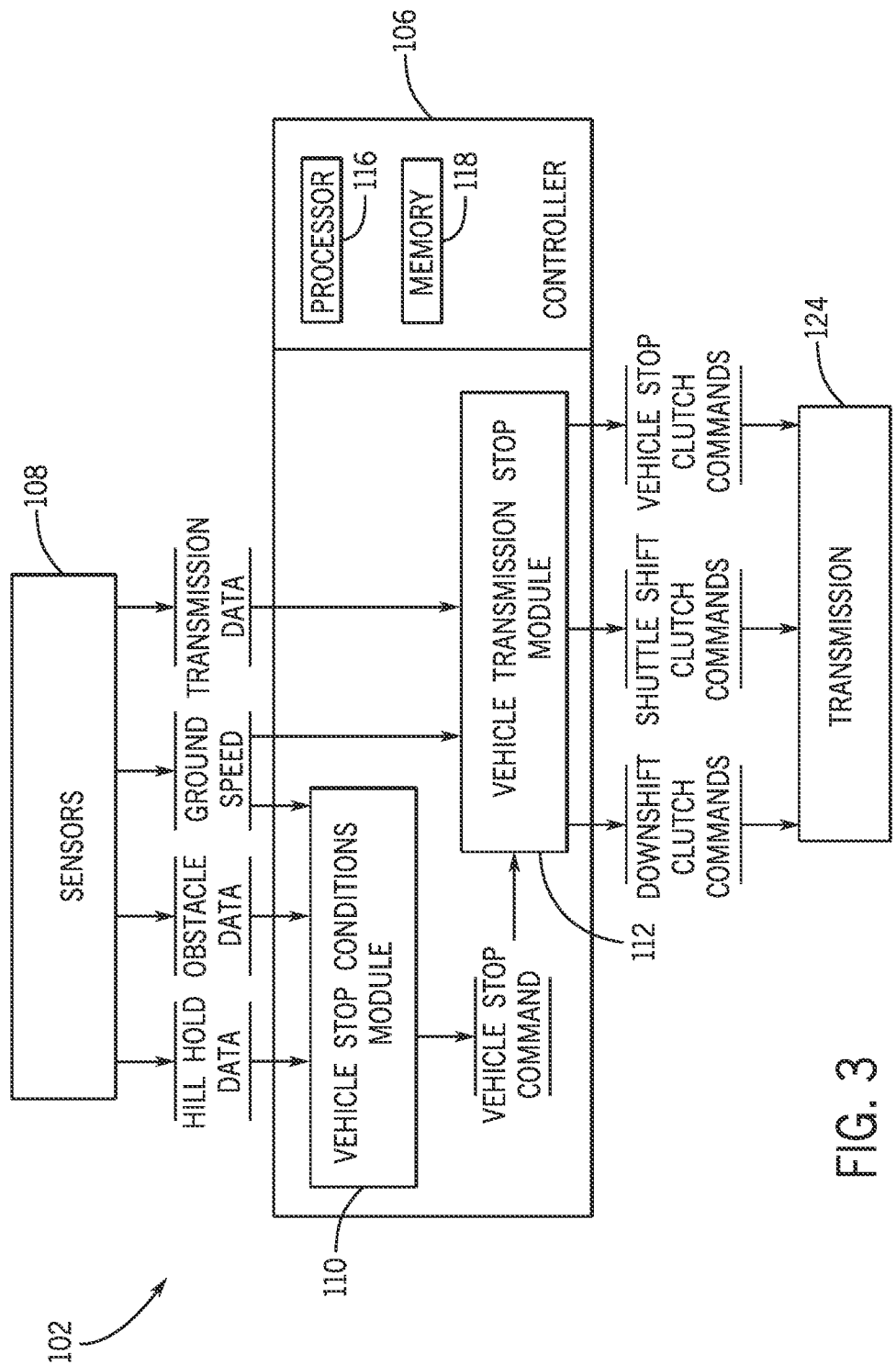
FIG. 3 is a dataflow diagram of a controller of the vehicle stop transmission control system of FIG. 1 implementing a vehicle stop transmission operation according to an example embodiment.

Additional details regarding the operation of the vehicle stop transmission operation of the vehicle stop transmission control system 102 may be provided with reference to FIG. 3, which is a dataflow diagram that illustrates an embodiment of the controller 104 implementing operation of the vehicle transmission stop system 102. In this instance, the controller 104 may be considered a vehicle controller, a dedicated transmission controller, or a distributed controller (or controllers). With respect to this aspect of the vehicle stop transmission control system 102 of FIG. 3, the controller 104 may be organized as one or more functional units or modules 110, 112 (e.g., software, hardware, or combinations thereof), including a vehicle stop conditions module 110 and a vehicle transmission stop module 112. As an example, the modules 110, 112 and other aspects of the controller 104 may be implemented with processing architecture such as a processor 114 and memory 116, as well as suitable communication interfaces. For example, the controller 104 may implement the modules 110, 112 with the processor 114 based on programs or instructions stored in memory 116.

During operation, the controller 104, particularly the vehicle stop conditions module 110, may receive various types of input signals or data, including from sensors 108. Generally, the vehicle stop conditions module 110 evaluates or otherwise processes the data and, under certain conditions, generates a vehicle stop command for the vehicle transmission stop module 112 to stop the vehicle 100. In some examples, the vehicle stop conditions module 110 may also receive input signals representing a request by the operator via the operator interface device (not shown) to stop the work vehicle 100 in the form of a stop vehicle request. Typically, however, the vehicle stop conditions modules 110 may derive the vehicle stop conditions and generate the vehicle stop command based on input data from the sensors 108, as will now be described.

As shown, the sensors 108 may generate input data for the vehicle stop conditions module 110 in the form of obstacle data and hill hold data, as well as other data, such as ground speed and other parameters. As introduced above, the obstacle data may include environmental and/or vehicle information that enables the vehicle stop conditions module 110 to identify obstacles in the projected path of the vehicle 100, and in response, generate a vehicle stop command for implementation by the vehicle transmission stop module 112 and transmission 124, as discussed in greater detail below. As also noted above, hill hold data may include information associated with the vehicle environment and the vehicle 100, such as position or kinematic information on which vehicle incline information may be determined and powertrain information. The vehicle stop conditions module 110 may evaluate the hill hold data to identify conditions suitable for a "hill hold" to generate a vehicle stop command implemented by the vehicle transmission stop module 112 and the transmission 124 discussed below.

Upon receipt the vehicle stop command, the vehicle transmission stop module 112 generates the commands for the transmission 124 to implement the vehicle stop. In one example and/or certain conditions, the vehicle transmission stop module 112 may generate the vehicle stop commands suitable to immediately implement the vehicle stop transmission operation. In other examples and/or certain conditions, the vehicle transmission stop module 112 may generate downshift clutch commands and/or shuttle shift clutch commands for the transmission 124 prior to generating the vehicle stop clutch commands. In particular, the vehicle transmission stop module 112 may generate downshift clutch commands and/or shuttle shift clutch commands for the transmission 124 as a function of the ground speed and/or other transmission data generated by the sensors 108. Additional details regarding the consideration of the ground speed and transmission data by the vehicle transmission stop module 112 to generate the various transmission commands (e.g., downshift clutch commands, shuttle shift clutch commands, and vehicle stop clutch commands) will be discussed below with reference to the method 300 of FIG. 4. Moreover, additional details about implementing the vehicle stop transmission operation via the vehicle stop clutch commands will be discussed in greater detail below with reference to FIGS. 5 and 6.

Figure 4:
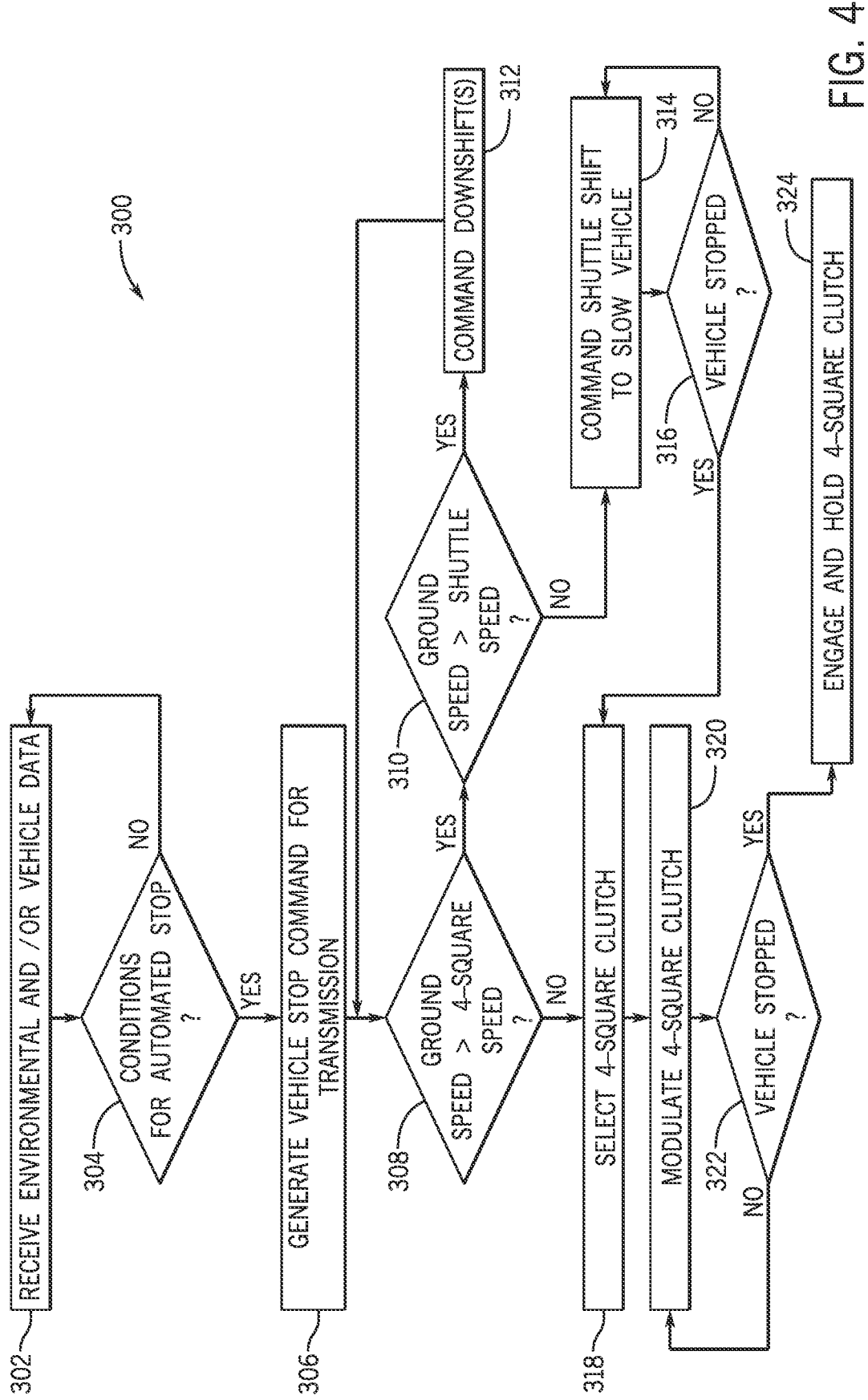
FIG. 4 is a flow chart of a vehicle stop transmission control method according to an example.

The operation of the vehicle stop transmission operation may be described in a larger context according to the flowchart of a method 300 depicted in FIG. 4. In one example, the method 300 may be implemented by the vehicle stop transmission control system 102 described above with reference to FIGS. 1-3, while in further examples, other mechanisms may be used. The vehicle stop transmission operation of FIG. 4 may be enabled manually by an operator or automatically enabled. Typically, the method 300 is described below in the context of a vehicle 100 operating normally, e.g., propulsion, maneuvering, and/or performing work tasks.

Initially, during operation of the vehicle 100, in a step 302, the controller 104 of the vehicle 100 receives environmental and/or vehicle data, for example, from sensors 108. As noted above, the environmental and/or vehicle data may include information about potential obstacles within a projected path, the inclination or angular position of the vehicle 100, the speed of the vehicle 100, and/or powertrain parameters, such as present transmission mode and/or torque conditions.

In step 304, the controller 104 evaluates the environmental and/or vehicle data in view of the conditions for an automated stop. For example, the controller 104 may review the environmental and/or vehicle data to determine if an obstacle is in the projected path of the vehicle 100 and/or to determine if the vehicle 100 is positioned on an incline such that a hill hold is desired. If the conditions are not suitable for an automated stop, the method 300 returns to step 302 in which the environmental and/or vehicle data continue to be received and evaluated. If the conditions are suitable for an automated stop, the method 300 proceeds to step 306.

In step 306 in which the conditions are suitable for an automated stop, the controller 104 generates and/or implements a transmission command to stop the vehicle 100. As noted above, the generation and implementation of the vehicle stop transmission operation may be performed by the same or different control architectures on the vehicle 100. In any event, the controller 104 "receives" the command (e.g., generated within or elsewhere) for execution.

In step 308, the controller 104 initiates implementation of the vehicle stop transmission command by comparing the ground speed to a first predetermined value or threshold representing a four-square clutch speed threshold. Generally, four-square clutch speed threshold reflects an operational or torque limit of the selected four-square clutch expressed as a vehicle speed. Such a limit may reflect the capacity of the selected four-square clutch to dissipate the energy. For example, it may be undesirable to engage the selected four-square clutch at relatively high vehicle speeds. The four-square clutch speed threshold may be stored in, or otherwise accessed by, the controller 104, e.g., in a look-up table.

In step 308, when the vehicle speed is above the four-square clutch speed threshold, the method 300 proceeds to step 310. In step 308, when the vehicle speed is less than or equal to the four-square clutch speed threshold, the method 300 proceeds to step 318.

In step 310, the controller 104 compares the ground speed to a second predetermined value or threshold representing a shuttle shift speed threshold. Generally, shuttle shift speed threshold reflects an operational or torque limit of the clutches involved in a shuttle shift expressed as a vehicle speed. Such a limit may reflect the capacity of the shuttle shift clutches to slow down and change direction during the shuttle shift. For example, it may be undesirable to implement the shuttle shift at relatively high vehicle speeds. The shuttle shift speed threshold may be stored in, or otherwise accessed by, the controller 104, e.g., in a look-up table. In one example, the shuttle shift speed threshold may be a greater speed than the four-square clutch speed threshold, while in other examples, the shuttle shift speed threshold and associated steps (e.g., steps 310, 314, 316) may be omitted.

In step 310, when the vehicle speed is above the shuttle shift speed threshold, the method 300 proceeds to step 312. In step 310, when the vehicle speed is less than or equal to the shuttle shift speed threshold, the method 300 proceeds to step 314. As such and discussed below, the effect of steps 308 and 310 is that when the ground speed is greater than the shuttle shift speed threshold, the method 300 proceeds to step 312 to execute a downshift; when the ground speed is greater than the four-square speed threshold and less than or equal to the shuttle shift threshold, the method 300 proceeds to step 314 to execute a shuttle shift; and when the ground speed is less than or equal to the four-square speed threshold, the method proceeds to step 318 to immediately implement the four-squaring operation.

In step 312, the controller 104 functions to command a downshift within the transmission 124. Typically, the transmission downshift operates to slow the vehicle 100, e.g., to facilitate reaching a speed suitable for four-squaring. Upon completion of the transmission downshift, the method 300 proceeds to step 308 in which the vehicle speed is again evaluated in view of the four-square speed threshold.

Returning to step 314, in response to the ground speed being less than or equal to the shuttle shift speed threshold, the controller 104 commands a shuttle shift within the transmission 124. As noted above, the transmission shuttle shift occurs to change the direction of the vehicle 100 (e.g., from forward to reverse or from reverse to forward). The shuttle shift operates to slow the vehicle 100, e.g., to facilitate reaching a speed suitable for four-squaring.

From step 314, the method 300 proceeds to step 316 in which the vehicle speed is evaluated to determine if the vehicle is stopped. If the vehicle 100 is stopped, the method 300 proceeds to step 318 to engage the four-square clutch, as described below. If the vehicle 100 is not stopped in step 316, the method 300 returns to step 314 to continue the shuttle shift operation or operations.

If the vehicle is stopped from step 316 or the vehicle speed is otherwise appropriate for four-square clutch engagement from step 308, the method 300 proceeds to step 318. In step 318, the controller 104 selects the one or more four-square clutches in the transmission 124. The selected four-square clutch may be function of the current mode. For example, the clutch appropriate for selection as a four-square clutch in the transmission 124 depicted in FIG. 2 is provided above in Table (1).

In step 320, the controller 104 generates commands to modulate the selected four-square clutch. The selected four-square clutch may be modulated as a ramp or slope to implement a desired deceleration, examples are which are discussed below with reference to FIGS. 5 and 6. As noted above, modulation of the selected four-square clutch functions to slow the vehicle 100.

Upon modulation of the four-square clutch in step 320, the method 300 proceeds to step 322 in which the vehicle speed is evaluated to determine if the vehicle 100 is stopped. If the vehicle 100 is still moving, the method 300 returns to step 320 to continue modulation of the four-square clutch to continue slowing the vehicle 100. If the vehicle 100 is stopped in step 322, the method 300 proceeds to step 324.

In step 324, the selected four-square clutch is fully engaged and held engaged to maintain the stationary position of the vehicle 100. Example implementations of engaging the four-square clutch and commands to the other clutches are discussed below with reference FIGS. 5 and. 6. The method 300 may terminate at this point to await further input or commands from the operator and/or controller 104.

Figure 5:
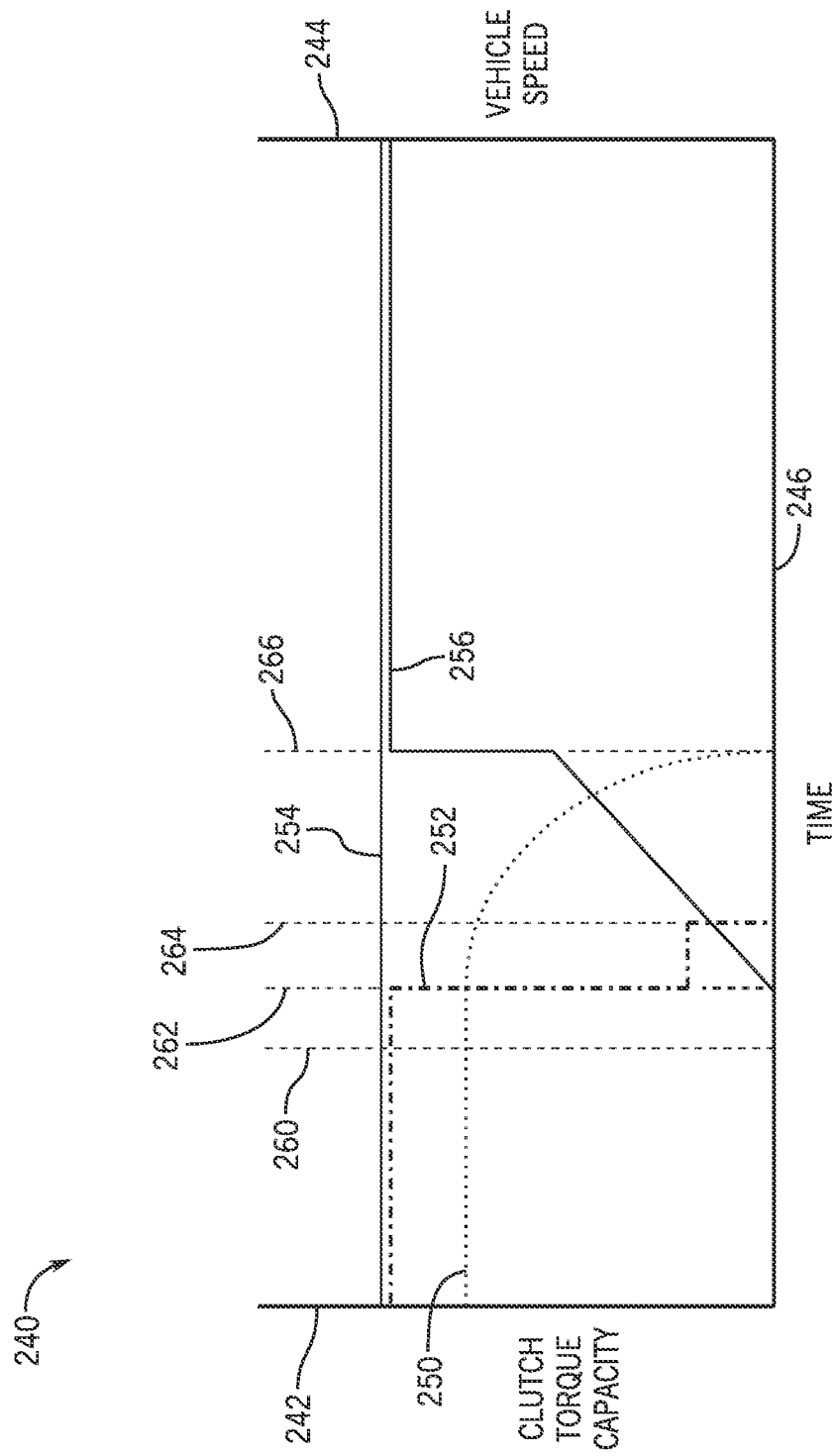
FIG. 5 is a clutch command schedule utilized within the vehicle stop transmission control system of FIG. 1 according to an example.
Figure 6:
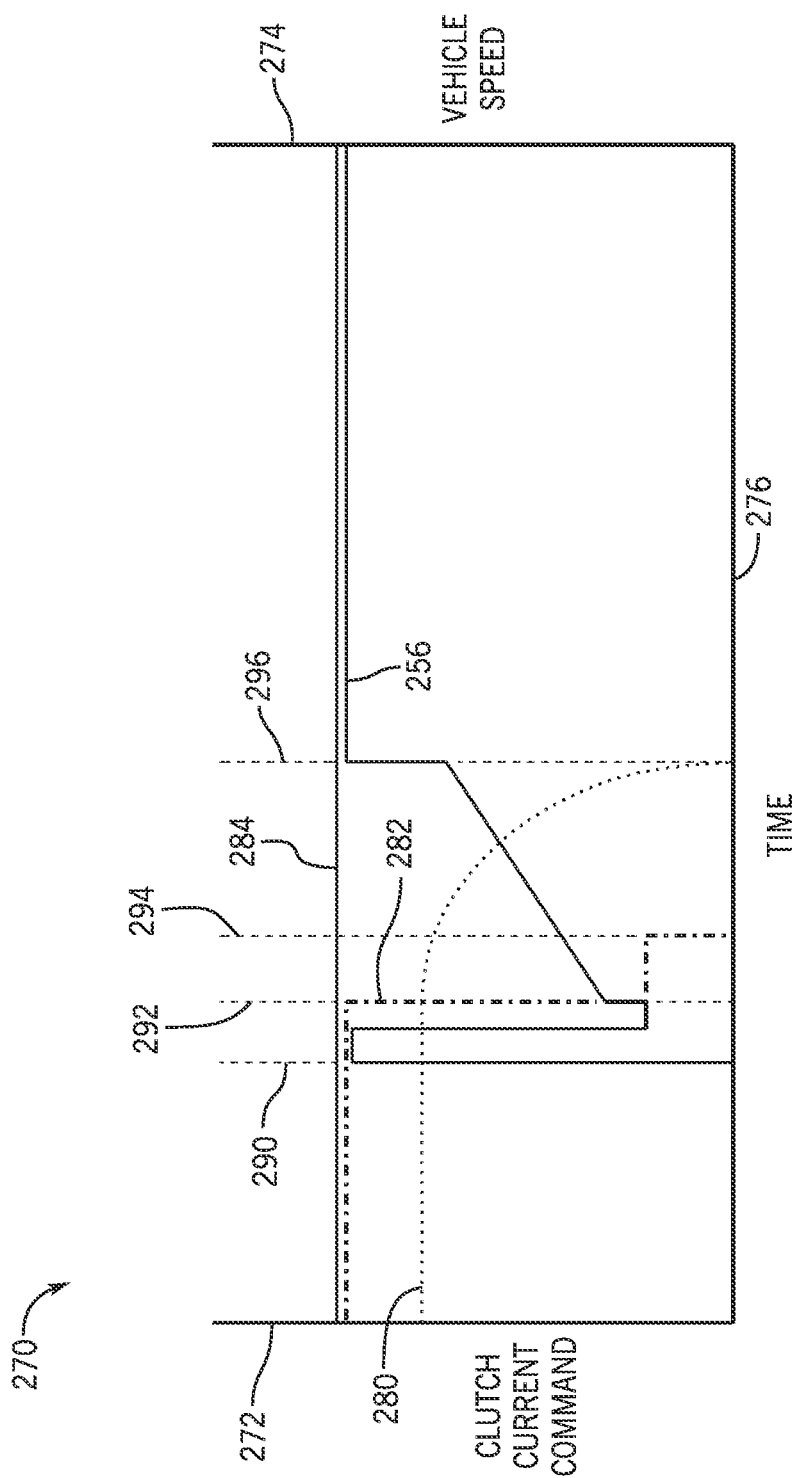
FIG. 6 is a further clutch command schedule utilized within the vehicle stop transmission control system of FIG. 1 according to an example.

Additional details regarding the operation of the vehicle stop transmission operation of the vehicle stop transmission control system 102 may be provided with reference to FIG. 5, which is a chart depicting a clutch command schedule 240 that reflects the relationship between clutch torque capacities, vehicle speed, and time immediately prior to and during a vehicle stop transmission operation (e.g., such as discussed in steps 320, 322, and 324 in the method 300 of FIG. 4). Additionally, and briefly referencing FIG. 3, the clutch command schedule 240 may be implemented by the vehicle transmission stop module 112 of the controller 104.

In FIG. 5, clutch torque capacity is reflected on a first (or left) y-axis 242, vehicle speed is reflected on the second (or right) y-axis 244, and time is reflected on the x-axis 246. Moreover, the vehicle speed over time is represented by line 250; input clutch torque capacity over time is represented by line 252; output clutch torque capacity over time is represented by line 254; and the four-square clutch torque capacity over time is represented by line 256. In general, the torque capacities 252, 254, 256 represent the level of engagement of the respective clutch, e.g., between zero engagement and a maximum engagement. As noted above, the input clutch torque capacity 252, output clutch torque capacity 254, and four-square clutch torque capacity 256 are controlled by the controller 104 in the example schedule depicted in FIG. 5 to bring the vehicle speed 250 to zero.

As shown, the input clutch torque capacity 252 and the output clutch torque capacity 254 are initially at a maximum during an initial time period, representing that the vehicle 100 is operating normally in one of the modes described above. At a first point in time 260, the controller 104 generates a stop command to initiate a vehicle stop transmission operation. As noted above and discussed in greater detail below, the controller 104 generates a stop command for various reasons, including to avoid an obstacle in the path of the vehicle 100 and/or to execute a hill on an incline.

Upon generation of the stop command at the first point in time 260, the controller 104 commands the preparation of the four-square clutch for engagement, e.g., by pressurizing the valves associated with the selected four-square clutch (e.g., clutch 190, 210 in the example above) for the current mode. At completion of preparation, represented by a second point in time 262, the controller 104 at least partially disengages the input clutch (e.g., clutch 150, 152, 170, 172 in the example above). Additionally, at the second point in time 262, the selected four-square clutch (e.g., clutch 190, 210) is at least partially engaged. As shown, the torque of the selected four-square clutch is initially zero and increases over time at a predetermined modulation ramp. The predetermined modulation ramp for the selected four-square clutch may be configured to produce a desired deceleration rate for the vehicle 100.

Initially at the second point in time 262, in this example, the controller 104 commands the input clutch to partially disengage (but to maintain some torque capacity) during a period between the second point in time 262 and a third point in time 264. The partial torque capacity of the input clutch during this period may provide a smoother transition during a vehicle stop transmission operation. As reflected in the plot of vehicle speed 250 that is overlaid onto the clutch command schedule 240, the engagement of the four-square clutch results in a decrease in vehicle speed 250 at the second point in time 262.

At the third point in time 264, the input clutch torque capacity 252 is reduced to zero. Further at the third point of time 264, the four-square clutch torque capacity 256 continues to increase until reaching a fourth point in time 266, which coincides with the vehicle speed 250 reaching zero. At the fourth point in time 266, the four-square clutch torque capacity 256 is increased to the maximum. In effect, at the fourth point in time 266, the vehicle 100 is completely stopped and the four-square clutch torque capacity 256 reflects in a fully engaged four-square clutch that holds the vehicle 100 in a stationary position. As a result, the vehicle stop transmission control system 102 demonstrates a mechanism for stopping the vehicle 100 with the transmission 124 according to the clutch command schedule 240 of FIG. 5.

Other vehicle stop transmission operations may be provided. A further clutch command schedule 270 is reflected in FIG. 6 by the relationships between clutch current commands (axis 272), vehicle speed (axis 274), and time (axis 276). In particular, the clutch command schedule 270 depicts vehicle speed 280 over time, input clutch current command 282 over time, output clutch current command 284 over time, and four-square clutch current command 286 over time. Briefly referencing FIG. 3, the clutch command schedule 270 may be implemented by the vehicle transmission stop module 112 of the controller 104.

As shown, the input clutch current command 282 and the output clutch current command 284 are initially at a maximum during an initial time period, representing that the vehicle 100 is operating normally in one of the modes described above. At a first point in time 290, the controller 104 generates a stop command to initiate a vehicle stop transmission operation. Upon generation of the stop command at the first point in time 290, the controller 104 commands the preparation of the four-square clutch for engagement, e.g., by providing a maximum current to the selected four-square clutch for a period of time, followed by a reduction in the current for a partial engagement of the four-square clutch. At completion of this preparation, represented by a second point in time 262, the input clutch is at least partially disengaged. Additionally, at the second point in time 262, the clutch current command to the selected four-square clutch may be increased in a stepped and/or linear manner, as shown, as part of a predetermined modulation ramp to produce a desired deceleration rate for the vehicle 100.

Initially at the second point in time 292, in this example, the controller 104 commands the input clutch to partially disengage (but to maintain some torque capacity) during a period between the second point in time 292 and a third point in time 294. The partial torque capacity of the input clutch during this period may provide a smoother transition during transmission vehicle stop operation. As also shown by the vehicle speed 280 overlaid within the clutch command schedule 270, the partial engagement of the four-square clutch results in a decrease in the vehicle speed 280 at the second point in time 292.

At the third point in time 294, the input clutch current command 282 is reduced to zero. Further, at the third point of time 294, the four-square clutch current command 286 continues to increase until reaching a fourth point in time 296, which coincides with the vehicle speed 280 decreasing to zero. At the fourth point in time 296, the four-square clutch current command 286 is increased to the maximum. In effect, at the fourth point in time 296, the vehicle 100 is completely stopped and the four-square clutch torque capacity 256 reflects a fully engaged four-square clutch that holds the vehicle 100 in a stationary position. As a result, the clutch command schedule 270 implemented by the vehicle stop transmission control system 102 demonstrates a mechanism for stopping the vehicle 100 with the transmission 124.

Accordingly, the present disclosure provides a mechanism for stopping a vehicle with the transmission, particularly in an autonomous situation to avoid an obstacle or to execute a hill hold, thereby avoiding additional hardware otherwise necessary to carry out such functions with axle or service brakes.

Also, the following examples are provided, which are numbered for easier reference.

1. A control system for operating a powertrain of a work vehicle having a power source configured to generate power for an output shaft, the control system comprising: a transmission positioned operatively between the power source and the output shaft and configured to selectively transfer the power from the power source to drive the output shaft in a first direction according to at least one forward mode and in a second direction according to at least one reverse mode, the transmission including: at least one forward input clutch configured for engagement when transferring the power in the at least one forward mode, at least one reverse input clutch configured for engagement when transferring the power in the at least one reverse mode, a first output clutch configured for engagement when transferring the power in a first mode of the at least one forward mode or the at least one reverse mode, and a second output clutch configured for engagement when transferring the power in a second mode of the at least one forward mode or the at least one reverse mode; and a controller, having a processor and memory architecture, configured to: receive or generate a vehicle stop command; determine a ground speed of the work vehicle; compare the ground speed to a first predetermined speed threshold and a second predetermined speed threshold; generate, when the ground speed exceeds the second predetermined speed threshold, at least one downshift command for the transmission to execute a downshift within the transmission; generate, when the ground speed is greater than the first predetermined speed threshold and less than or equal to the second predetermined speed threshold, at least one shuttle shift command for the transmission to execute a shuttle shift within the transmission; determine, when the ground speed is less than or equal to the first predetermined speed threshold, if the transmission is operating in the first mode or the second mode as an operating mode; select, upon determining the operating mode, a four-square clutch from the first output clutch and the second output clutch, including selecting the second output clutch as the selected four-square clutch when the transmission is operating in the first mode and the first output clutch as the selected four-square clutch when the transmission is operating in the second mode; and at least partially engage the selected four-square clutch to slow or stop the work vehicle.

2. The control system of example 1, wherein the controller is further configured to, after the at least partial engagement of the selected four-square clutch: evaluate the ground speed of the work vehicle; and completely engage the selected four-square clutch when the speed of the work vehicle is approximately zero.

3. The control system of example 2, wherein the controller is further configured to, upon executing the downshift: compare the ground speed to the first predetermined speed threshold and the second predetermined speed threshold; generate, when the ground speed exceeds the second predetermined speed threshold, a further downshift command for the transmission to execute a further downshift within the transmission; generate, when the ground speed is greater than the first predetermined speed threshold and less than or equal to the second predetermined speed threshold, the at least one shuttle shift command for the transmission to execute the shuttle shift within the transmission; determine, when the ground speed is less than or equal to the first predetermined speed threshold, if the transmission is operating in the first mode or the second mode as an operating mode; select, upon determining the operating mode, the four-square clutch from the first output clutch and the second output clutch, including selecting the second output clutch as the selected four-square clutch when the transmission is operating in the first mode and the first output clutch as the selected four-square clutch when the transmission is operating in the second mode; and at least partially engage the selected four-square clutch to slow the work vehicle.

4. The control system of example 1, wherein the controller is further configured to, upon executing the shuttle shift: evaluate the ground speed of the work vehicle; and completely engage the selected four-square clutch when the speed of the work vehicle is approximately zero.

5. The control system of example 1, wherein the controller is further configured to: receive sensor data from at least one sensor on the work vehicle; evaluate the sensor data to identify a vehicle stop condition; and generate the vehicle stop command when the vehicle stop condition is identified to stop the work vehicle.

6. The control system of example 5, wherein the sensor data is obstacle data, and wherein the controller is further configured to: evaluate the obstacle data to identify the vehicle stop condition as an obstacle in the path of the work vehicle; and generate the vehicle stop command when the obstacle is in the path of the work vehicle.

7. The control system of example 5, wherein the sensor data is incline data, and wherein the controller is further configured to: evaluate the obstacle data to identify the vehicle stop condition as a hill hold condition; and generate the work vehicle stop command upon identifying the hill hold condition.

8. The control system of example 1, wherein the controller is further configured to, upon at least partially engaging the selected four-square clutch, partially disengage the at least one forward input clutch or the at least one reverse input clutch.

9. The control system of example 1, wherein the controller is further configured to, upon the ground speed reaching zero, completely disengage the at least one forward input clutch or the at least one reverse input clutch and completely engage the selected four-square clutch.

10. The control system of example 9, wherein the controller is configured to, during operation in the first mode, maintain engagement of the first output clutch when at least partially engaging the selected four-square clutch, and during operation in the second mode, maintain engagement of the second output clutch when at least partially engaging the selected four-square clutch.

11. The control system of example 10, wherein the controller is configured to, during operation in the first mode, maintain engagement of the first output clutch when completely engaging the selected four-square clutch and the ground speed reaching zero, and during operation in the second mode, maintain engagement of the second output clutch when completely engaging the selected four-square clutch and the ground speed reaching zero.

12. A method of operating a powertrain of a work vehicle having a power source configured to generate power for an output shaft, a transmission positioned operatively between the power source and the output shaft and configured to selectively transfer the power from the power source to drive the output shaft in a first direction according to at least one forward mode and in a second direction according to at least one reverse mode, the transmission including at least one forward input clutch configured for engagement when transferring the power in the at least one forward mode, and at least one reverse input clutch configured for engagement when transferring the power in the at least one reverse mode, and a first output clutch configured for engagement when transferring the power in a first mode of the at least one forward mode or the at least one reverse mode, and a second output clutch configured for engagement when transferring the power in a second mode of the at least one forward mode or the at least one reverse mode, the method comprising: receiving or generating a vehicle stop command to slow and stop the work vehicle; determining, with a controller on the work vehicle, a ground speed of the work vehicle; comparing by the controller the ground speed to a first predetermined speed threshold and a second predetermined speed threshold; generating by the controller, when the ground speed exceeds the second predetermined speed threshold, at least one downshift command for the transmission to execute a downshift within the transmission; generating by the controller, when the ground speed is greater than the first predetermined speed threshold and less than or equal to the second predetermined speed threshold, at least one shuttle shift command for the transmission to execute a shuttle shift within the transmission; determining by the controller, when the ground speed is less than or equal to the first predetermined speed threshold, if the transmission is operating in the first mode or the second mode as an operating mode; selecting by the controller, upon determining the operating mode, a four-square clutch from the first output clutch and the second output clutch, including selecting the second output clutch as the selected four-square clutch when the transmission is operating in the first mode and the first output clutch as the selected four-square clutch when the transmission is operating in the second mode; and at least partially engaging the selected four-square clutch to slow the work vehicle.

13. The method of example 12, further comprising, after the at least partial engagement of the selected four-square clutch: evaluating the ground speed of the work vehicle; and completely engaging the selected four-square clutch when the speed of the work vehicle is approximately zero.

14. The method of example 13, further comprising, upon executing the downshift: comparing the ground speed to the first predetermined speed threshold and the second predetermined speed threshold; generating, when the ground speed exceeds the second predetermined speed threshold, a further downshift command for the transmission to execute a further downshift within the transmission; generating, when the ground speed is greater than the first predetermined speed threshold and less than or equal to the second predetermined speed threshold, the at least one shuttle shift command for the transmission to execute the shuttle shift within the transmission; determining, when the ground speed is less than or equal to the first predetermined speed threshold, if the transmission is operating in the first mode or the second mode as an operating mode; selecting, upon determining the operating mode, the four-square clutch from the first output clutch and the second output clutch, including selecting the second output clutch as the selected four-square clutch when the transmission is operating in the first mode and the first output clutch as the selected four-square clutch when the transmission is operating in the second mode; and at least partially engaging the selected four-square clutch to slow or stop the work vehicle.

15. The method of example 12, further comprising, upon executing the shuttle shift: evaluating the ground speed of the work vehicle; and completely engaging the selected four-square clutch when the speed of the work vehicle is approximately zero.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In certain configurations, fluidic transfer of rotational power by a torque converter may also be considered "direct." In contrast, power may not be considered as "directly" transmitted between two system elements if some portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly). Also, as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations in the described example(s). Accordingly, various embodiments and implementations other than those explicitly described are within the scope of the following claims.

What is claimed is:

1. A control system for operating a powertrain of a work vehicle having a power source configured to generate power for an output shaft, the control system comprising:
    a transmission positioned operatively between the power source and the output shaft and configured to selectively transfer the power from the power source to drive the output shaft in a first direction according to at least one forward mode and in a second direction according to at least one reverse mode, the transmission including:
        at least one forward input clutch configured for engagement when transferring the power in the at least one forward mode,
        at least one reverse input clutch configured for engagement when transferring the power in the at least one reverse mode,
        a first output clutch configured for engagement when transferring the power in a first mode of the at least one forward mode or the at least one reverse mode, and
        a second output clutch configured for engagement when transferring the power in a second mode of the at least one forward mode or the at least one reverse mode; and
    a controller, having a processor and memory architecture, configured to:
    receive or generate a vehicle stop command;
    determine a ground speed of the work vehicle;
    compare the ground speed to a first predetermined speed threshold and a second predetermined speed threshold;
    generate, when the ground speed exceeds the second predetermined speed threshold, at least one downshift command for the transmission to execute a downshift within the transmission;
    generate, when the ground speed is greater than the first predetermined speed threshold and less than or equal to the second predetermined speed threshold, at least one shuttle shift command for the transmission to execute a shuttle shift within the transmission;
    determine, when the ground speed is less than or equal to the first predetermined speed threshold, if the transmission is operating in the first mode or the second mode as an operating mode;
    select, upon determining the operating mode, a four-square clutch from the first output clutch and the second output clutch, including selecting the second output clutch as the selected four-square clutch when the transmission is operating in the first mode and the first output clutch as the selected four-square clutch when the transmission is operating in the second mode; and
    at least partially engage the selected four-square clutch to slow or stop the work vehicle.

2. The control system of claim 1, wherein the controller is further configured to, after the at least partial engagement of the selected four-square clutch:
    evaluate the ground speed of the work vehicle; and
    completely engage the selected four-square clutch when the ground speed of the work vehicle is approximately zero.

3. The control system of claim 2, wherein the controller is further configured to, upon executing the downshift:
    compare the ground speed to the first predetermined speed threshold and the second predetermined speed threshold;
    generate, when the ground speed exceeds the second predetermined speed threshold, a further downshift command for the transmission to execute a further downshift within the transmission;

generate, when the ground speed is greater than the first predetermined speed threshold and less than or equal to the second predetermined speed threshold, the at least one shuttle shift command for the transmission to execute the shuttle shift within the transmission;

determine, when the ground speed is less than or equal to the first predetermined speed threshold, if the transmission is operating in the first mode or the second mode as an operating mode;

select, upon determining the operating mode, the four-square clutch from the first output clutch and the second output clutch, including selecting the second output clutch as the selected four-square clutch when the transmission is operating in the first mode and the first output clutch as the selected four-square clutch when the transmission is operating in the second mode; and at least partially engage the selected four-square clutch to slow the work vehicle.

4. The control system of claim 1, wherein the controller is further configured to, upon executing the shuttle shift:
evaluate the ground speed of the work vehicle; and
completely engage the selected four-square clutch when the ground speed of the work vehicle is approximately zero.

5. The control system of claim 1, wherein the controller is further configured to:
receive sensor data from at least one sensor on the work vehicle;
evaluate the sensor data to identify a vehicle stop condition; and
generate the vehicle stop command when the vehicle stop condition is identified to stop the work vehicle.

6. The control system of claim 5, wherein the sensor data is obstacle data, and wherein the controller is further configured to:
evaluate the obstacle data to identify the vehicle stop condition as an obstacle in the path of the work vehicle; and
generate the vehicle stop command when the obstacle is in the path of the work vehicle.

7. The control system of claim 5, wherein the sensor data is incline data, and wherein the controller is further configured to:
evaluate the obstacle data to identify the vehicle stop condition as a hill hold condition; and
generate the work vehicle stop command upon identifying the hill hold condition.

8. The control system of claim 1, wherein the controller is further configured to, upon at least partially engaging the selected four-square clutch, partially disengage the at least one forward input clutch or the at least one reverse input clutch.

9. The control system of claim 1, wherein the controller is further configured to, upon the ground speed reaching zero, completely disengage the at least one forward input clutch or the at least one reverse input clutch and completely engage the selected four-square clutch.

10. The control system of claim 9, wherein the controller is configured to, during operation in the first mode, maintain engagement of the first output clutch when at least partially engaging the selected four-square clutch, and during operation in the second mode, maintain engagement of the second output clutch when at least partially engaging the selected four-square clutch.

11. The control system of claim 10, wherein the controller is configured to, during operation in the first mode, maintain engagement of the first output clutch when completely engaging the selected four-square clutch and the ground speed reaching zero, and during operation in the second mode, maintain engagement of the second output clutch when completely engaging the selected four-square clutch and the ground speed reaching zero.

12. A method of operating a powertrain of a work vehicle having a power source configured to generate power for an output shaft, a transmission positioned operatively between the power source and the output shaft and configured to selectively transfer the power from the power source to drive the output shaft in a first direction according to at least one forward mode and in a second direction according to at least one reverse mode, the transmission including at least one forward input clutch configured for engagement when transferring the power in the at least one forward mode, and at least one reverse input clutch configured for engagement when transferring the power in the at least one reverse mode, and a first output clutch configured for engagement when transferring the power in a first mode of the at least one forward mode or the at least one reverse mode, and a second output clutch configured for engagement when transferring the power in a second mode of the at least one forward mode or the at least one reverse mode, the method comprising:
receiving or generating a vehicle stop command to slow and stop the work vehicle;
determining, with a controller on the work vehicle, a ground speed of the work vehicle;
comparing by the controller the ground speed to a first predetermined speed threshold and a second predetermined speed threshold;
generating by the controller, when the ground speed exceeds the second predetermined speed threshold, at least one downshift command for the transmission to execute a downshift within the transmission;
generating by the controller, when the ground speed is greater than the first predetermined speed threshold and less than or equal to the second predetermined speed threshold, at least one shuttle shift command for the transmission to execute a shuttle shift within the transmission;
determining by the controller, when the ground speed is less than or equal to the first predetermined speed threshold, if the transmission is operating in the first mode or the second mode as an operating mode;
selecting by the controller, upon determining the operating mode, a four-square clutch from the first output clutch and the second output clutch, including selecting the second output clutch as the selected four-square clutch when the transmission is operating in the first mode and the first output clutch as the selected four-square clutch when the transmission is operating in the second mode; and
at least partially engaging the selected four-square clutch to slow the work vehicle.

13. The method of claim 12, further comprising, after the at least partial engagement of the selected four-square clutch:
evaluating the ground speed of the work vehicle; and
completely engaging the selected four-square clutch when the ground speed of the work vehicle is approximately zero.

14. The method of claim 13, further comprising, upon executing the downshift:
- comparing the ground speed to the first predetermined speed threshold and the second predetermined speed threshold;
- generating, when the ground speed exceeds the second predetermined speed threshold, a further downshift command for the transmission to execute a further downshift within the transmission;
- generating, when the ground speed is greater than the first predetermined speed threshold and less than or equal to the second predetermined speed threshold, the at least one shuttle shift command for the transmission to execute the shuttle shift within the transmission;
- determining, when the ground speed is less than or equal to the first predetermined speed threshold, if the transmission is operating in the first mode or the second mode as an operating mode;
- selecting, upon determining the operating mode, the four-square clutch from the first output clutch and the second output clutch, including selecting the second output clutch as the selected four-square clutch when the transmission is operating in the first mode and the first output clutch as the selected four-square clutch when the transmission is operating in the second mode; and
- at least partially engaging the selected four-square clutch to slow or stop the work vehicle.

15. The method of claim 12, further comprising, upon executing the shuttle shift:
- evaluating the ground speed of the work vehicle; and
- completely engaging the selected four-square clutch when the ground speed of the work vehicle is approximately zero.

16. The method of claim 12, further comprising:
- receiving sensor data from at least one sensor on the work vehicle;
- evaluating the sensor data to identify a vehicle stop condition; and
- generating the vehicle stop command when the vehicle stop condition is identified.

17. The method of claim 16, wherein the sensor data is obstacle data, and wherein the method further comprises:
- evaluating the obstacle data to identify the vehicle stop condition as an obstacle in the path of the work vehicle; and
- generating the vehicle stop command when the obstacle is in the path of the work vehicle.

18. The control system of claim 16, wherein the sensor data is incline data, and wherein the method further comprises:
- evaluating the obstacle data to identify the vehicle stop condition as a hill hold condition; and
- generating the work vehicle stop command upon identifying the hill hold condition to stop the work vehicle.

19. The method of claim 12, further comprising, upon at least partially engaging the selected four-square clutch, partially disengaging the at least one forward input clutch or the at least one reverse input clutch.

20. The method of claim 12, further comprising, upon the ground speed reaching zero, completely disengage the at least one forward input clutch or the at least one reverse input clutch and completely engage the selected four-square clutch.

* * * * *